United States Patent
Nakajima et al.

(10) Patent No.: US 9,446,673 B2
(45) Date of Patent: *Sep. 20, 2016

(54) CHARGING PORT DEVICE FOR ELECTRIC VEHICLE

(71) Applicants: Nissan Motor Co., Ltd., Yokohama-shi, Kanagawa (JP); MITSUBA Corporation, Kiryu-shi, Gunma (JP)

(72) Inventors: Tsuyoshi Nakajima, Sagamihara (JP); Tsuyoshi Maruyama, Ota (JP); Hiroyuki Senda, Ashikaga (JP)

(73) Assignees: Nissan Motor Co., Ltd., Yokohama (JP); Mitsuba Corporation, Gunma (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/408,300

(22) PCT Filed: Jun. 5, 2013

(86) PCT No.: PCT/JP2013/065539
§ 371 (c)(1),
(2) Date: Dec. 16, 2014

(87) PCT Pub. No.: WO2014/010337
PCT Pub. Date: Jan. 16, 2014

(65) Prior Publication Data
US 2015/0197157 A1    Jul. 16, 2015

(30) Foreign Application Priority Data

Jul. 9, 2012   (JP) ................................. 2012-153461

(51) Int. Cl.
*H01R 13/62* (2006.01)
*B60L 11/18* (2006.01)
*H01R 13/639* (2006.01)
*B60K 1/04* (2006.01)
*H01R 13/627* (2006.01)

(52) U.S. Cl.
CPC ........ *B60L 11/1818* (2013.01); *B60L 11/1877* (2013.01); *H01R 13/639* (2013.01); *H01R 13/6397* (2013.01); *B60K 1/04* (2013.01); *B60L 2270/32* (2013.01); *B60L 2270/34* (2013.01); *H01R 13/6275* (2013.01); *Y02T 10/7005* (2013.01); *Y02T 10/705* (2013.01); *Y02T 10/7072* (2013.01); *Y02T 90/14* (2013.01)

(58) Field of Classification Search
CPC ............................ H01R 13/6397; H01R 4/30
USPC .................................................. 439/306, 352
See application file for complete search history.

(56) References Cited

U.S. PATENT DOCUMENTS 8,152,550 B2* 4/2012 Ichio ................... H01R 13/5227
439/304
8,197,277 B1* 6/2012 Teichmann ......... B60L 11/1818
439/304
2011/0281452 A1    11/2011 Kurumizawa et al.

FOREIGN PATENT DOCUMENTS

JP    2010-264847 A    11/2010
JP     2011-81952 A     4/2011
(Continued)

*Primary Examiner* — Phuong Dinh
(74) *Attorney, Agent, or Firm* — Global IP Counselors, LLP

(57) ABSTRACT

A lock mechanism, when a restricting member is being moved to a predetermined position which corresponds to one of a locked state or an unlocked state, imparts a torque, using a motor, to move the restricting member from an inner-side position near the predetermined position to the predetermined position using a toggle spring disposed between the restricting member and a vehicle body side.

6 Claims, 8 Drawing Sheets

(56) References Cited

FOREIGN PATENT DOCUMENTS

| JP | 2011-165609 A | 8/2011 |
| JP | 2011-238530 A | 11/2011 |
| JP | 2011-243498 A | 12/2011 |

* cited by examiner

CHARGING PORT DEVICE FOR ELECTRIC VEHICLE

CROSS-REFERENCE TO RELATED APPLICATIONS

This application is a U.S. National stage application of International Application No. PCT/JP2013/065539, filed Jun. 5, 2013, which claims priority to Japanese Patent Application No. 2012-153461 filed in Japan on Jul. 9, 2012, the contents of each of which are hereby incorporated herein by reference.

BACKGROUND

1. Field of the Invention

The present invention relates to a charging port device for charging a battery mounted in an electric vehicle.

2. Background Information

Japanese Laid-Open Patent Application No. 2010-264847 discloses a technique relating to a charging port device for an electric vehicle. In particular, Japanese Laid-Open Patent Application No. 2010-264847 discloses a charging connector for connecting a charging port of an electric vehicle and a charging stand having a power supply means or device. The charging connector has a link 41 that is capable of turning with a button operation performed by the operator so as to enable coupling, and the charging connector engages a protrusion 34 in a charging inlet 11, thereby preventing the charging connector and the charging inlet from detaching from each other during charging. Also disclosed is a configuration having a slide-type lock bar (hereafter referred to as a lock mechanism) for disabling the link 41 from rotating in order to prevent the removal and theft of the charging cable during charging.

SUMMARY

When the abovementioned lock mechanism is actuated by a motor, a configuration in which the motor and the lock bar are continuously coupled results in excessive load being applied to the motor, the link mechanism, and similar elements, presenting a durability problem.

In view of the abovementioned problem, an object of the present invention is to provide a highly durable charging port device for an electric vehicle in which a charging port and a charging connector are prevented from unexpectedly disconnecting from each other.

To achieve the above objective, a charging port device for an electric vehicle according to the present invention has a locked state and an unlocked state in which the release of engagement between an engaging part of a charging connector and an engaged part of a charging port is restricted by a restricting member in the locked state, and the operation of releasing the state of engagement is allowed in the unlocked state. The lock mechanism, when the restricting member is moved to a predetermined position which corresponds to a locked state or an unlocked state, imparts a torque using a motor to an inner-side position short of the predetermined position, and moves the restricting member from the inner-side position to the predetermined position using a toggle spring disposed between the restricting member and the vehicle body side.

Thus, because the motor is not used to move the restricting member across the entire actuation range of the restricting member, it is possible to prevent an excessive load from being applied on the restricting member, improving durability. In addition, since movement is produced using a toggle spring, it is possible to apply an urging force to a predetermined position, making it possible to maintain the predetermined position in a stable manner.

BRIEF DESCRIPTION OF THE DRAWINGS

Referring now to the attached drawings which form a part of this original disclosure.

DETAILED DESCRIPTION OF EMBODIMENTS

Embodiment 1

Figure 1:
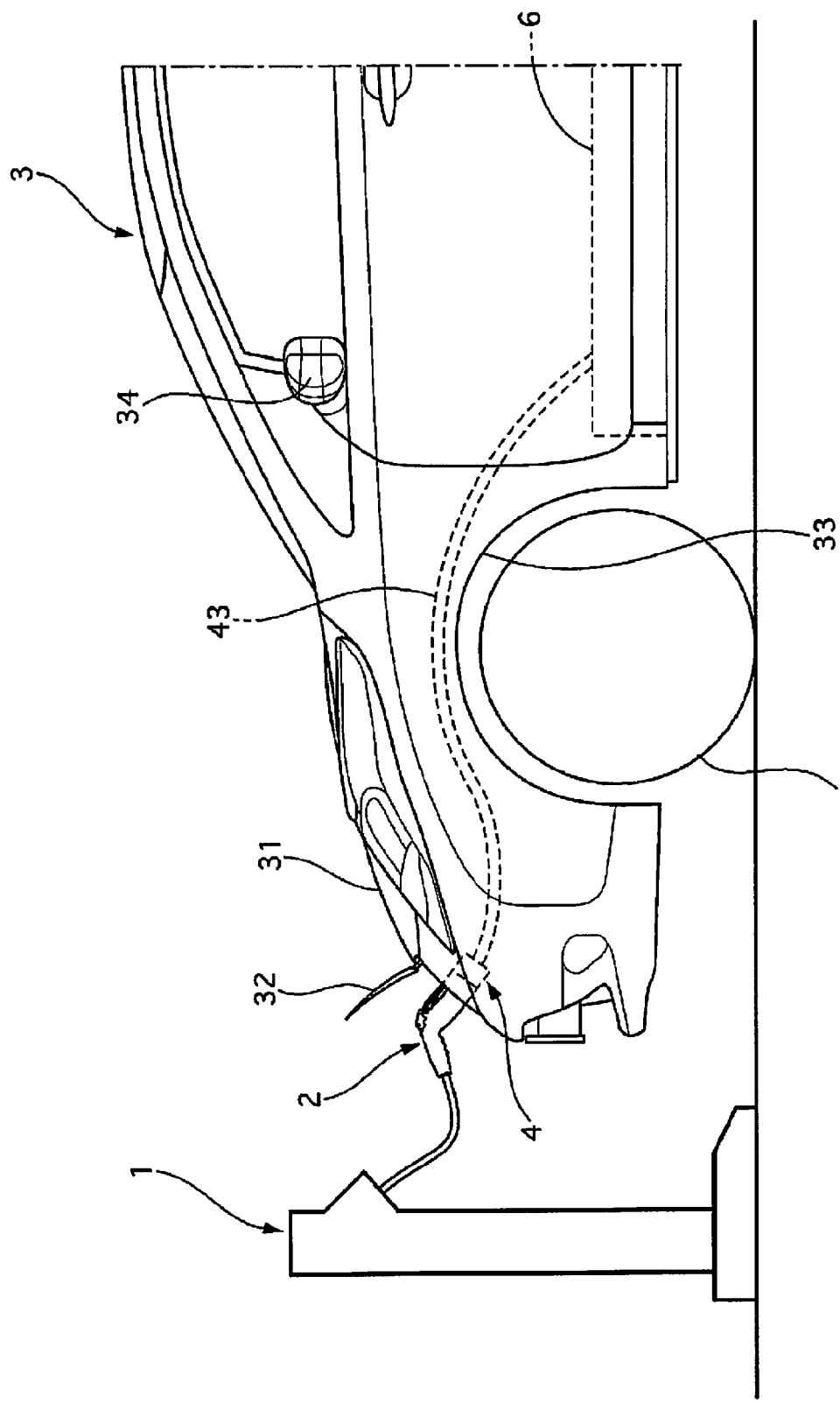
FIG. 1 is a schematic diagram showing a state in which an electric vehicle with a charging port device according to a first embodiment is being charged.

FIG. 1 is a schematic diagram showing an electric vehicle with a charging port device according to a first embodiment being charged. A charging port 4 is electrically connected by a cable 43 to an automotive battery 6 mounted on a floor of a vehicle 3, and is disposed on the front of the vehicle 3, further forward than the hood 31. The charging port 4 is disposed at a position that is substantially the same height as an upper end of tire wheel arches 33 of the tire wheel 5 and lower than that of side mirrors 34, and is closed by a charge lid 32 when not charging. A charging connector 2 for supplying power is disposed on a charging stand 1. When charging is to be performed, the charge lid 32 is opened and the charging connector 2 is connected by inserting the charging connector 2 into the charging port 4, whereby charging can be performed. The vehicle according to the first embodiment includes both a rapid charging port, used when connecting to a rapid charger, and a normal charging port, used when charging using domestic power or the like. In the first embodiment, a description of the normal charging port will be provided as an example, because when the rapid charging port is used, the connection time is relatively short. It shall be apparent that a lock mechanism may also be disposed on the rapid charging port.

Figure 2:
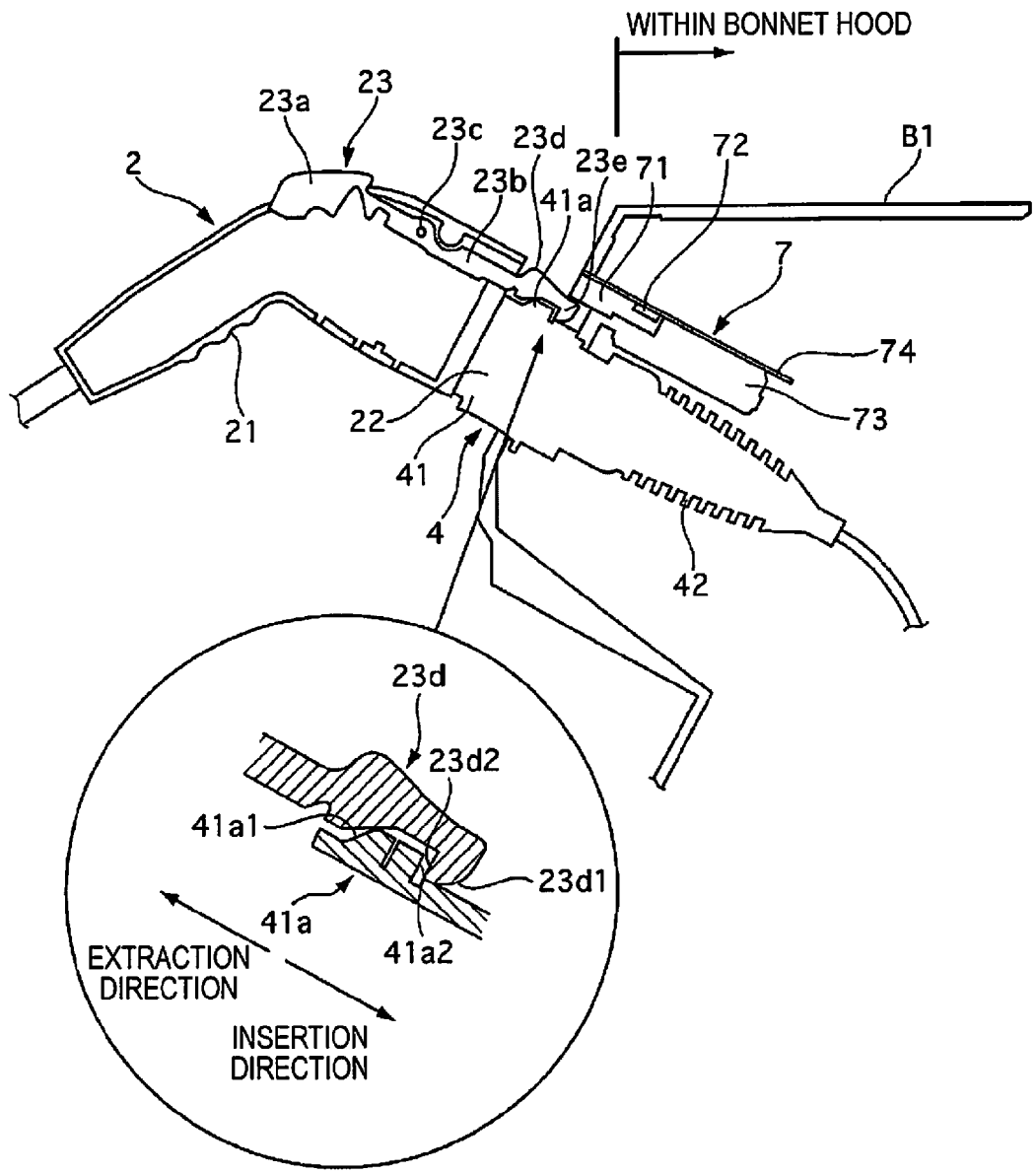
FIG. 2 is a schematic cross-sectional view showing a state in which a charging port and a charging connector of the first embodiment are connected.

FIG. 2 is a schematic cross-sectional view showing the charging port and the charging connector of the first embodiment connected. The charging port 4 has: an insertion receiving member 41, which is fixed on the vehicle side to a body-constituting member B1 interposed by a bracket 74, the charging connector 2 being inserted into the insertion-receiving member 41; the cable 43 connected to the insertion-receiving member 41 inside the vehicle body; and a tube 42 for coating a connection part of the cable 43. A convex part 41a (engaged part) is formed on the outer periphery of the insertion-receiving member 41, and an insertion hole, into which an insertion part 22 can be inserted only in a predetermined positional relationship, is formed in the inner periphery of the insertion-receiving member 41.

The charging connector 2 is generally of a type that is commonly installed and is a standardized product for which the format and size are stipulated by a unified standard. The charging connector 2 is connected by an operator to the charging port 4 of the vehicle. The charging connector 2 has a grip section 21 to be gripped by the operator, the insertion part 22 inserted into the charging port 4 on the vehicle side, and an engaging member 23 which can be engaged and released with respect to the charging port 4 by the operator. The engaging member 23 engages the convex part 41a disposed on the charging port 4 side when the charging connector 2 is connected to the charging port 4 and thereby regulates movement in the direction in which the charging connector 2 is extracted from the charging port 4.

The engaging member 23 is a member that turns about a support point 23c fixed against a case member of the charging connector 2. The engaging member 23 is urged by an elastic body (not shown) so that a release button 23a is positioned higher in FIG. 2 (i.e., so that a claw part 23d is positioned lower in FIG. 2). The release button 23a, which the operator can press while gripping the grip section 21, is present at a grip section 21 side end section of the charging connector 2. The claw part 23d, which engages with the convex part 41a, is present at an insertion part 22 end section of the charging connector 2. The claw part 23d has a claw shape in which a distal end portion has: a curved section 23d1 having a curved surface which is smooth with respect to the direction of insertion; and a stepped section 23d2 which is acutely angled with respect to the direction of extraction. A sloped surface 41a1 is formed on an end surface representing the outer side with respect to the vehicle body of the convex part 41a, and an engaging surface 41a2, which is substantially perpendicular to the direction of extraction, is formed on an end surface representing the inner side with respect to the vehicle body of the convex part 41a, forming an anisotropic convex shape.

When the charging connector 2 is inserted into the charging port 4, the curved section 23d1 at the distal end portion of the claw part 23d is able to pass over the sloped surface of the convex part 41a without any particular operation being performed on the release button 23a. Once the stepped section 23d2 passes the engaging surface 41a2, the action of the elastic body (not shown) pushes the claw part 23d downwards, and the claw part 23d and the convex part 41a engage with each other. The charging connector 2 may also be inserted while pressing the release button 23a. The stepped section 23d2 and the engaging surface 41a2 thereby engage, regulating movement in the direction of extraction even if the operator pulls the charging connector 2 in the direction of extraction without operating the release button 23a. In order to release the engagement, the release button 23a is pushed inwards to turn the engaging member 23 about the support point 23c and move the claw part 23d above the engaging surface 41a2, whereby the engagement is released.

Figure 3:
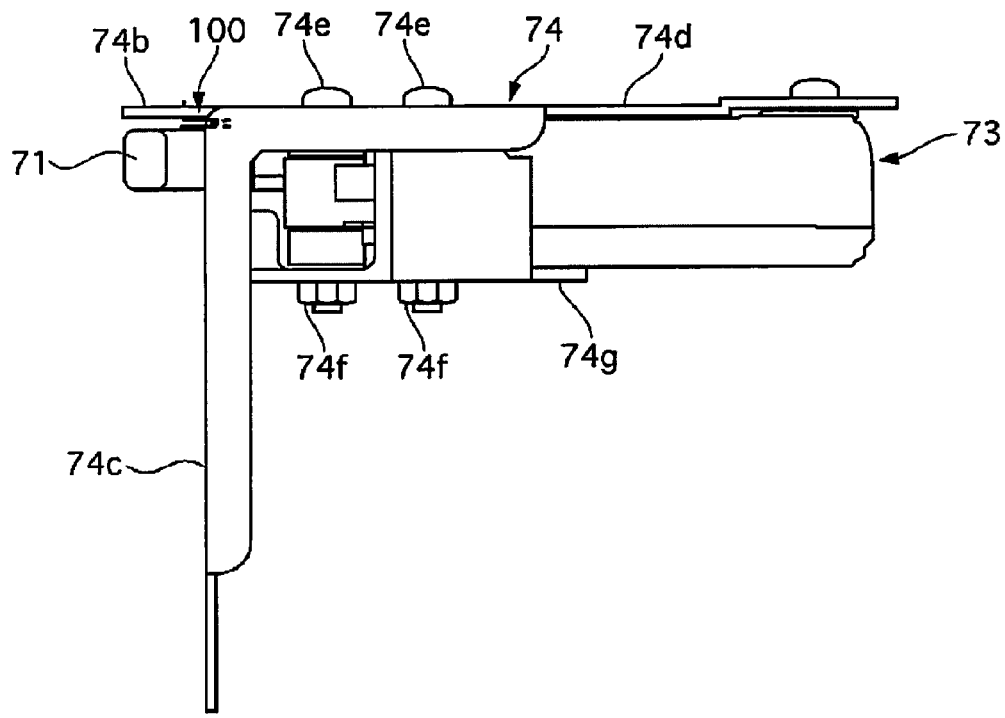
FIG. 3 is a side view showing the configuration of a lock mechanism according to the first embodiment.
Figure 4:
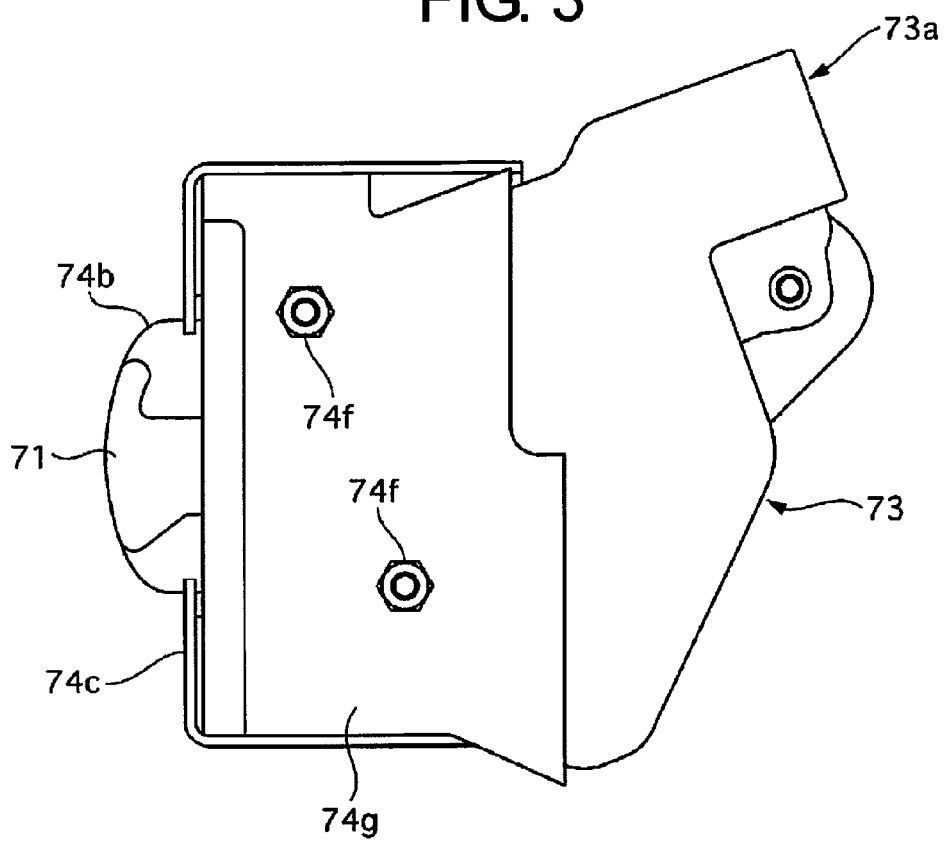
FIG. 4 is a bottom view showing the configuration of the lock mechanism according to the first embodiment.

FIG. 3 is a side view showing the configuration of a lock mechanism according to the first embodiment, and FIG. 4 is a bottom view showing the configuration of the lock mechanism according to the first embodiment.

The lock mechanism 7 for restricting the turning movement of the engaging member 23 is provided above the charging port 4. The lock mechanism 7 has: a swing arm 71, which produces, by being positioned in a direction in which the claw part 23d separates away from the convex part 41a, a state of restricting the separation (hereafter referred to as a "locked state"), and produces, by not being positioned in a direction in which the claw part 23d separates away from the convex part 41a, a state of not restricting the separation (hereafter referred to as an "unlocked state"); a lock actuator 73 for driving the swing arm 71; and the bracket 74 for fixing and supporting the insertion-receiving member 41 of the charging port 4 and the lock actuator 73.

As can be seen in the side view shown in FIG. 3 and the bottom view shown in FIG. 4, the bracket 74 has: an upper surface section 74d, which fixes and supports the lock actuator 73 using bolts 74e; a support extension section 74b, which extends from the upper surface section 74d so as to cover the mobility range of the swing arm 71; a side surface section 74c, which is folded at a substantially right angle with respect to the upper surface section 74d, the insertion-receiving member 41 and similar elements being attached to the side surface section 74c by a bolt; and a cover member 74g, which is attached from the side opposite that of the upper surface section 74d, the cover member 74g and the upper surface section 74d sandwiching the lock actuator 73. The upper surface section 74d, the lock actuator 73, and the cover member 74g are integrally assembled by a plurality of bolts 74e and nuts 74f. An opening 74a for forcible operation following failure, through which a fixing screw 72 (described further below) can be operated, is formed on the upper surface section 74d (see FIGS. 2 and 7, etc.); the operator is able to open the hood and turn the fixing screw 72 using a screwdriver or a similar tool. The reason for this will be described further below. A toggle spring 100 for assisting the movement of the swing arm 71 is disposed between the support extension section 74b and the swing arm 71. The toggle spring 100 applies a torque, from a position nearer the center than that which the swing arm 71 is in a locked state, towards the position at which the swing arm 71 is in a locked state. Similarly, the toggle spring 100 applies a torque, from a position nearer the center than that at which the swing arm 71 is in an unlocked state, towards the position at which the swing arm 71 is in an unlocked state. Details of the toggle spring 100 will be described further below.

Figure 5:
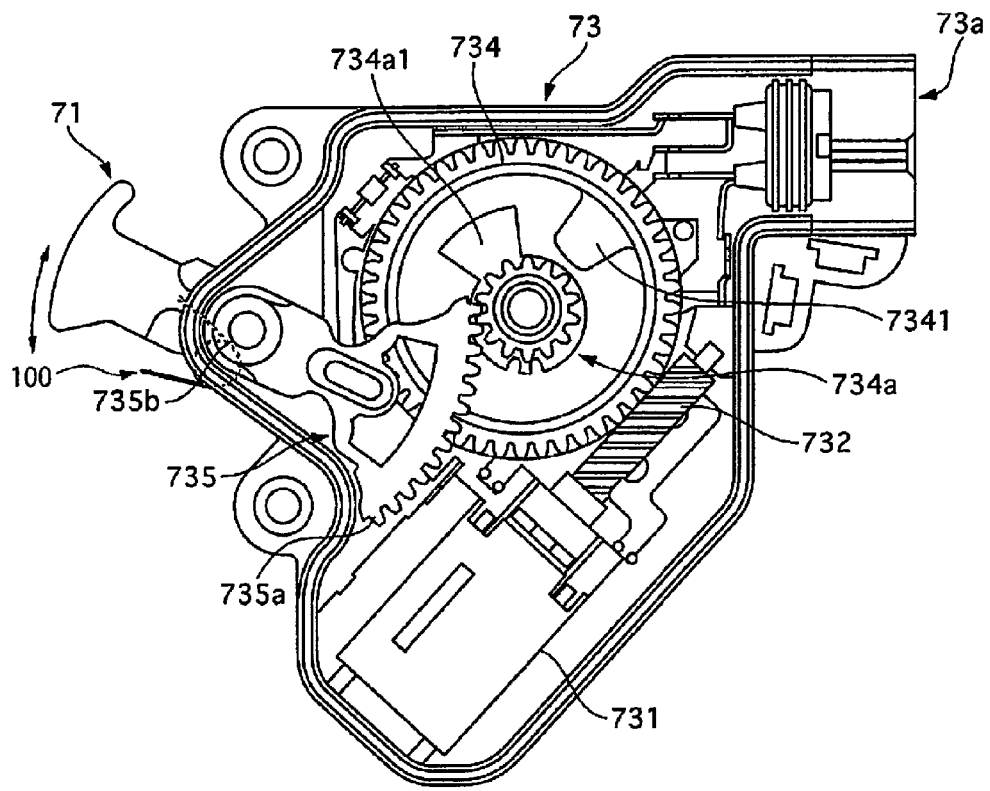
FIG. 5 is an internal structural diagram showing the mechanical configuration of the lock mechanism according to the first embodiment.

FIG. 5 is an internal structural diagram showing the mechanical configuration of the lock mechanism according to the first embodiment. The lock actuator 73 has: a connector unit 73a which connects to an external power supply and a controller; a motor 731 which is rotationally driven on the basis of a command signal; a worm 732, which rotates integrally with the rotor of the motor 731; a worm wheel 734, which engages with the worm 732 and rotates; a drive gear 734a, which has a smaller diameter than that of the worm wheel 734 and the same rotation axis as that of the worm wheel 734, and which rotates relative to the worm wheel 734; and a driven member 735, which engages with the drive gear 734a and has a toothed surface on the outer periphery. A partially raised engaging convex part 7341 is provided on a board surface of the worm wheel 734. An engaged part 734a1 extending in a substantially fan-shape is formed on the outer diameter of the drive gear 734a. When the worm wheel 734 rotates, the engaging convex part 7341 also turns. In such an instance, when the engaging convex part 7341 and the engaged part 734a1 are in a non-engaged state, the drive gear 734a does not turn. When the engaging convex part 7341 and the engaged part 734a1 engage, the drive gear 734a thereby begins to turn. This operation acts in the same way whether the worm wheel 734 rotates clockwise or counterclockwise in FIG. 5.

The first embodiment is configured so that the swing arm 71 is turned by the torque (corresponding to an electrical driving mechanism) from the motor 731 to an inner-side position short of that at which the swing arm 71 is in a locked or an unlocked state, and is turned thereafter, i.e., to the position at which the swing arm 71 is in a locked or an unlocked state, by the torque from the toggle spring 100 (corresponding to a mechanical driving mechanism). At this point, the driven member 735 is turned further by the torque from the toggle spring 100. At this point, the engaged part 734a1, which is actuated integrally with the driven member 735, turns away from the engaging convex part 7341 of the worm wheel 734 which is actuated integrally with the motor 731. Therefore, the action of the motor 731 does not affect this turning motion. A configuration of such description makes it possible to readily turn the swing arm 71 when the swing arm 71 is turned and released by manual operation, even when a fault develops in the motor 731 and the motor 731 is no longer able to perform the rotational driving operation. The relationship with the toggle spring 100 will be described further below.

The driven member 735 has a substantially fan-shaped meshing part 735a having a toothed surface formed on the outer periphery, and a turning shaft section 735b assembled with the swing arm 71 so as to be integral. The swing arm 71 is a member which actuates so that the turning shaft section 735b functions as a turning axis. In other words, the swing arm 71 has a turning axis oriented in a direction different from the direction in which the charging connector 2 is inserted and extracted and different from the direction of the turning axis of the engaging member 23. The lock mechanism of the first embodiment requires the swing arm 71 to actuate only within a predetermined angular range; therefore, using a driven member 735 having a toothed surface on a partial portion thereof makes it possible to perform actuation with sufficient torque even when the motor 731 is small. A lock actuator 73 of such description is also employed in common automotive auto-door-lock and similar mechanisms, and components of such mechanisms can be transferred for use in order to reduce production cost.

Figure 6:
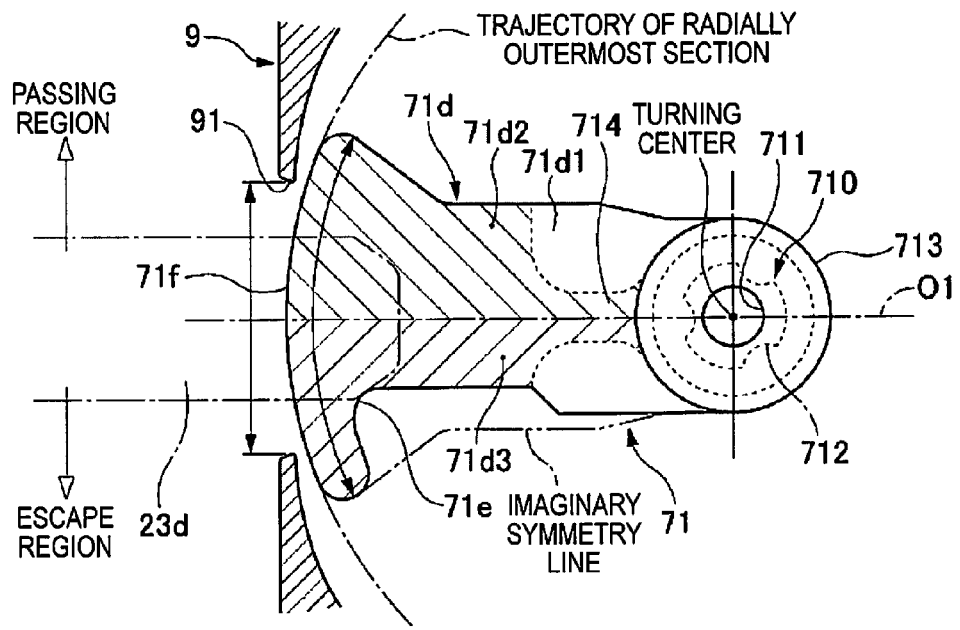
FIG. 6 is a top view showing the configuration of the swing arm of the lock mechanism according to the first embodiment.

FIG. 6 is a top view showing the configuration of the swing arm of the lock mechanism according to the first embodiment. The swing arm 71 has an attaching section 710, which is attached to the turning shaft section 735b of the lock actuator 73 so that the attaching section 710 and the turning shaft section 735b do not rotate relative to each other, and a cylindrically shaped cylindrical wall 713 covering the outer circumference of the attaching section 710. Recesses 712 are formed at three locations on the circumference of the attaching section 710. Convex parts formed on the turning shaft section 735b side fit into the recesses 712, whereby relative rotational movement is regulated. A through hole 711 is formed at the center of the attaching section 710, and is penetrated by the fixing screw 72 for integrally fixing the swing arm 71 and the turning shaft section 735b to each other. The through hole 711 puts the upper part of the swing arm 71 and the lock actuator 73 side in communication with each other, and as a result, in an instance in which freezing or the like hinders the actuation of the swing arm 71 and hot water is applied to defrost the frozen state, the through hole 711 also functions as a passage for channeling the hot water, making it possible to promptly defrost the frozen state. The fixing screw 72 is screwed to a female screw part disposed on the turning shaft section 735b side, whereby the turning shaft section 735b and the swing arm 71 actuate integrally.

The direction in which the fixing screw 72 is tightened is the same direction as that in which the swing arm 71 turns in the unlocking direction. This is in order to make it possible, even when the lock actuator 73 fails or develops another problem and becomes completely unable to perform a release movement, to turn the swing arm 71 in the release direction by tightening the fixing screw 72.

Figure 7:
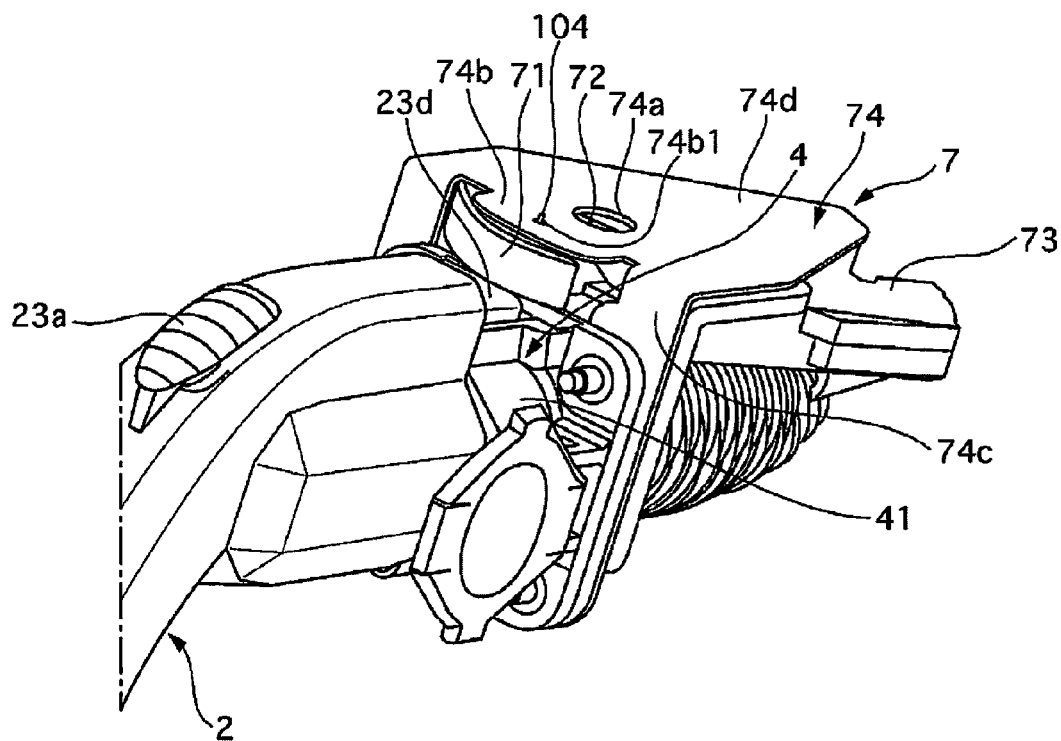
FIG. 7 is a schematic perspective view of a state in which the charging connector and the charging port according to the first embodiment are connected.

FIG. 7 is a schematic perspective view of a state in which the charging connector and the charging port according to the first embodiment are connected. With reference to FIGS. 7 and 2, the fixing screw 72 is disposed so as to be exposed in the opening 74a for forcible operation following failure and inside the hood. In order to open the hood, normally, a hood release lever in the vehicle compartment is operated. The fixing screw 72 is located at a position that can be readily accessed as long as the release lever can be operated, or, in other words, at a position that cannot be accessed by opening the charge lid 32. The fixing screw 72 is thereby formed so that a stranger who has no access to the vehicle compartment is not able to operate the fixing screw 72 unauthorized. The fixing screw 72 can also be readily operated using a cross-head screwdriver or a similar tool available, e.g., as an automotive tool, allowing the operator to perform the release operation.

A plate-shaped arm member 71d extends from the cylindrical wall 713 leftwards in FIG. 6. The arm member 71d is designed so as to expand at a distal end in a fan shape and overlap with the claw part 23d in top view (corresponding to being positioned in the direction of separation of the engaging member). A lightened section 71d1 for reducing weight and a rib 714 for providing sufficient strength are formed on the arm member 71d.

The swing arm 71 is formed from a resin, and formed so as to be vertically asymmetrical in top view as shown in FIG. 6. Using an axis O1, which links the turning center of the swing arm 71 (i.e., the point at which the turning axis of the swing arm 71 and the center of the swing arm 71 in the thickness direction coincide) and the turning center of the engaging member 23 in the locked state (i.e., the point at which the turning axis of the engaging member 23 and the center of the engaging member 23 coincide), as a reference line in top view, an imaginary symmetry line representing vertical symmetry is indicated by a dotted line, and a description will now be given on the basis of a relationship with the imaginary symmetry line. The portion below the axis O1 is, in other words, a region corresponding to the swing arm 71 escaping when shifting from a restricting state of the lock mechanism to a non-restricting state. Accordingly, the region below the axis O1 is defined as an escape region, and the region above the axis O1 is defined as a passing region.

If the swing arm 71 is symmetrical between the escape region and the passing region, the area of the region that is located further on the escape region side than the claw part 23d will be larger. In such a case, the following problem is presented. Since the charging port 4 is provided at a relatively low position on the vehicle, when another vehicle passes nearby, there may be cases in which sherbet-like snow, muddy water, or similar matter is kicked up and splashed onto the charging port 4. In addition, when charging is performed in an extremely low-temperature environment, there may be cases in which the splashed sherbet-like snow or muddy water freezes, forming icicle-like obstacles hanging off the arm member 71d of the swing arm 71 which acts as a roof. In such a case, if the region of the arm member 71d in the escape region is larger, the icicle-shaped obstacles or the like more readily form, and a risk is presented in that even when an unlocking command is outputted, the obstacles on the swing arm 71 and the claw part 23d catch on each other, preventing unlocking.

Therefore, the arm member 71d is cut away significantly from the imaginary symmetry line to the vicinity of the claw part 23d. In other words, the area 71d3 of the arm member 71d present in the escape region (i.e., the top-view area on the side of the direction in which the swing arm 71 is turned to a restricting state, in relation to a line linking the turning center of the claw part 23d and the turning center of the swing arm 71 when positioned in the direction of separation of the claw part 23d) is smaller than the area 71d2 of the arm member 71d present in the passing region (i.e., the top-view area on the side of the direction in which the swing arm 71 is turned to a non-restricting state, in relation to the line linking the turning center of the claw part 23d and the turning center of the swing arm 71 when positioned in the direction of separation of the claw part 23d). The portion acting as a roof in the escape region can be thereby made smaller, making it less likely for icicle-shaped obstacles or the like to form, therefore making it possible to smoothly actuate the swing arm 71 during unlocking. In particular, cutting away the arm member 71d to the limit of the region that overlaps the claw part 23d in top view makes it possible to further reduce the possibility of obstacles or the like forming while restricting the movement of the claw part 23d in the direction of separation in a reliable manner.

Next, a radially outermost section 71f of the swing arm 71 is shaped, in a top view, so as to be symmetrical about the reference line, which is the axis O1. Specifically, in envisioning a situation in which, when the swing arm 71 is turned by actuation of the lock actuator 73, the swing arm 71 does not sufficiently turn due to a failure or another problem, ensuring that the swing arm 71 is still positioned in the direction of separation of the claw part 23d will be more reliable if the radially outermost section 71f has a sufficient length.

Figure 8:
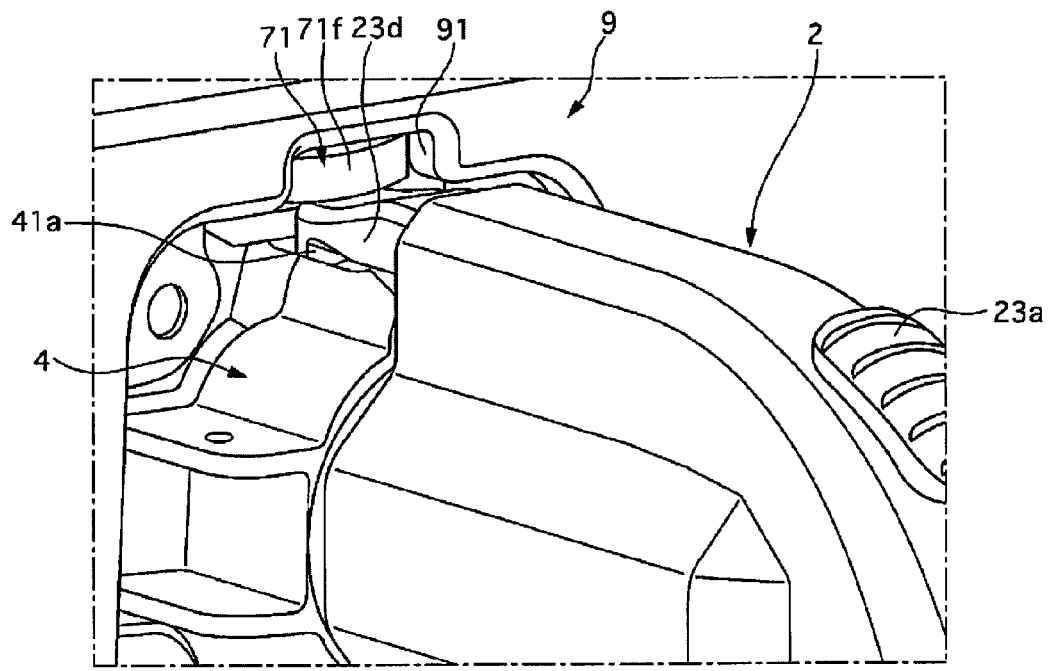
FIG. 8 is a perspective view showing a state in which the charging connector and the charging port according to the first embodiment are connected.

FIG. 8 is a perspective view showing a state in which the charging connector and the charging port according to the first embodiment are connected. When the charging connector 2 is inserted into the charging port 4, the lock mechanism 7 is actuated, and the swing arm 71 is positioned in the direction of separation of the claw part 23d, the claw part 23d cannot be moved in the separation direction even when the release button 23a is pressed. The convex part 41a and the claw part 23d are thereby prevented from disengaging, and the charging connector 2 is prevented from being extracted. A cover member 9 for providing protection against entry of dirt and the like into the lock mechanism 7 and other structures is provided to the charging port 4 of the vehicle. The cover member 9 covers the lock mechanism 7 from the side of the direction in which the charging connector 2 is inserted and extracted, and has an opening 91 into which the claw part 23d can be inserted and in which a part of the swing arm 71 is exposed.

When the operator inserts the charging connector 2 into the charging port 4, actuates the lock mechanism 7, leaves the location, and starts charging, the radially outermost section 71f of the swing arm 71 is in an exposed state as shown in FIG. 8. If the gap between the cover member 9 and the radially outermost section 71f is larger, it will be possible to insert a finger or an object into the gap and forcibly pry open the swing arm 71. Therefore, the gap between the swing arm 71 and the cover member 9 is set to be narrow, without there being any contact.

In a state in which the lock mechanism 7 is restricting the removal of the charging connector 2, the entirety of the opening 91 is closed by the radially outermost section 71f of the swing arm 71. In other words, the length of the radially outermost section 71f in the direction of turn is greater than the opening width (i.e., the length in the direction of turn) of the opening 91. This is to prevent the possibility of a gap being present between an end section of the opening 91 and an end section of the swing arm 71 and the swing arm 71 being forcibly pried open by inserting a finger or an object into such a gap as described above.

A description will now be given, with reference to FIG. 6, for the relationship between the cover member 9 and the swing arm 71. As shown in FIG. 6, the gap between an inner peripheral surface of the cover member 9 and the trajectory of the radially outermost section 71f when the swing arm 71 performs a turn is set so as to expand with increasing distance from the opening 91. Specifically, in a case in which the charging connector 2 is connected to the charging port 4 in a state in which the dirt or the like (e.g., chewing gum, mud, dust clumps, etc.) is adhered to the claw part 23d, the turning motion of the swing arm 71 is performed while scraping off (sweeping) the dirt. If the gap between the inner peripheral surface of the cover member 9 and the trajectory of the radially outermost section 71f is set so as to gradually narrow, there is a risk of the scraped-off dirt getting trapped in the gap, generating a large resistance and preventing the actuation of the swing arm 71. Therefore, the gap between the inner peripheral surface of the cover member 9 and the trajectory of the radially outermost section 71f is set so as to expand with increasing distance from the opening 91, whereby the scraped-off dirt falls downwards in an appropriate manner, preventing dirt blockages or similar problems.

Figure 9:
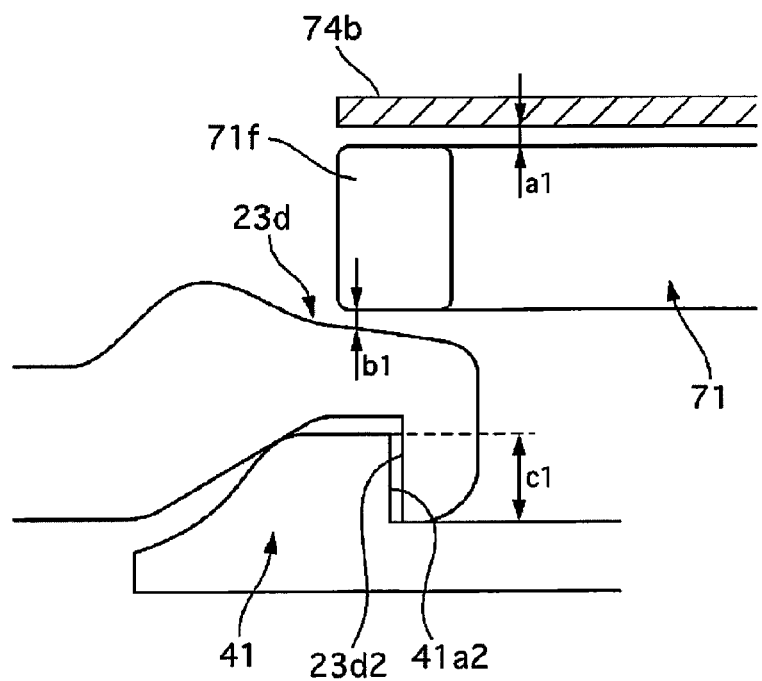
FIG. 9 is a schematic cross-sectional view showing the positional relationship between the engaging member and the swing arm according to the first embodiment.

FIG. 9 is a schematic cross-sectional view showing the positional relationship between the engaging member and the swing arm according to the first embodiment. A predetermined gap $a1$ is present between an upper surface of the swing arm 71 and the support extension section 74b, and a predetermined gap $b1$ is also present between a lower surface of the swing arm 71 and the claw part 23d. Accordingly, when the swing arm 71 turns, the swing arm 71 does not come into contact with the support extension section 74b or the claw part 23d, allowing the swing arm 71 to actuate in a smooth manner. When the height of a region in which the stepped section 23d2 and the engaging surface 41a2 overlap when viewed from the direction in which the charging connector 2 is inserted and extracted is represented by $c1$, a configuration is present so that the relationship $c1>(a1+b1)$ is satisfied. Accordingly, even if the claw part 23*d* is unduly forced upwards and the gaps a1, b1 are eliminated as shown in FIG. 10, the stepped section 23*d*2 and the engaging surface 41*a*2 remain engaged.

Figure 10:
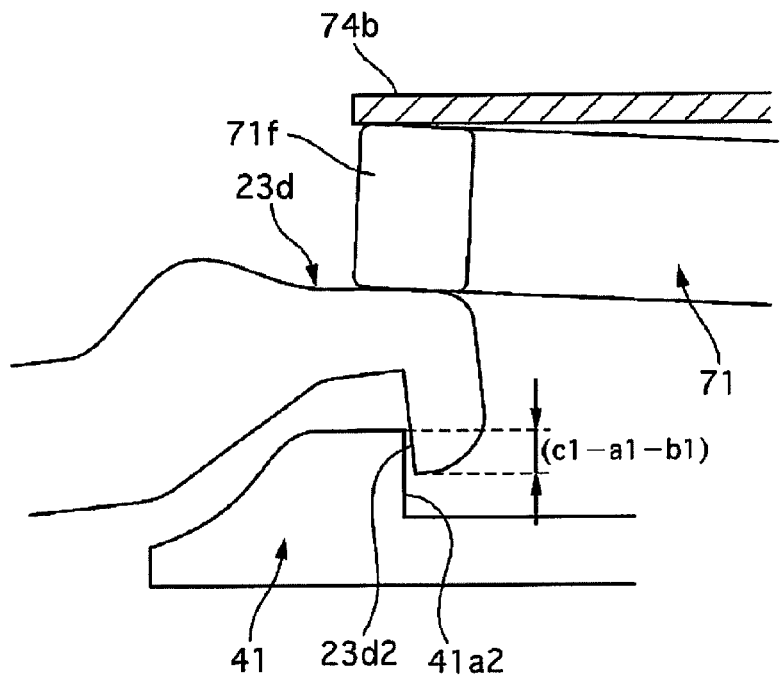
FIG. 10 is a schematic cross-sectional view showing the positional relationship between the engaging member and the swing arm according to the first embodiment when the engaging member is unduly actuated in the direction of separation.

FIG. 10 is a schematic cross-sectional view showing the positional relationship between the engaging member and the swing arm according to the first embodiment when the engaging member is unduly actuated in the direction of separation. When the release button 23*a* is pressed inwards in a state in which the lock mechanism 7 is actuating and the movement of the engaging member 23 in the direction of separation is restricted, an upper surface of the claw part 23*d* comes into contact with the lower surface of the swing arm 71 and presses the swing arm 71 upwards. The swing arm 71 is made of a resin, and the turning shaft section 735*b* of the lock actuator 73 is also not designed to be excessively firm; therefore, the swing arm 71 is readily pushed upwards due to deformation or a tilt in the turning axis. However, the support extension section 74*b* is provided, and therefore contact with the support extension section 74*b* suppresses further deformation. In addition, because a force only acts in the thickness direction of the swing arm 71, sufficient strength against a compressive force can be obtained even when the swing arm 71 is made of a resin. Specifically, the turning axis of the swing arm 71 is oriented in a different direction from the direction in which the charging connector 2 is inserted and extracted, and also from the direction of the turning axis of the engaging member 23. In other words, the orientation of the turning axis of the swing arm 71 and the orientation of the turning axis of the engaging member 23 are not in a parallel relationship, the swing arm 71 is interposed in the direction of separation of the claw part 23*d* to provide restriction, and the support extension section 74*b* is further provided. As a result, even when an undue force is inputted from the claw part 23*d*, the force does not act in the direction of turn of the swing arm 71; therefore, a sufficient restricting state can be maintained without the need to reinforce the swing arm 71 in the direction of turn or the need to reinforce the structure in the vicinity of the turning axis.

Figure 11:
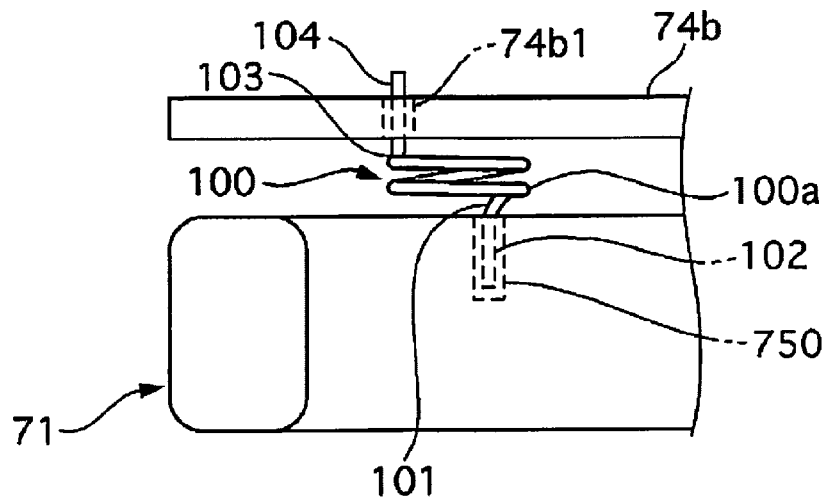
FIG. 11 is a schematic diagram illustrating a portion provided with the toggle spring according to the first embodiment.
Figure 12:
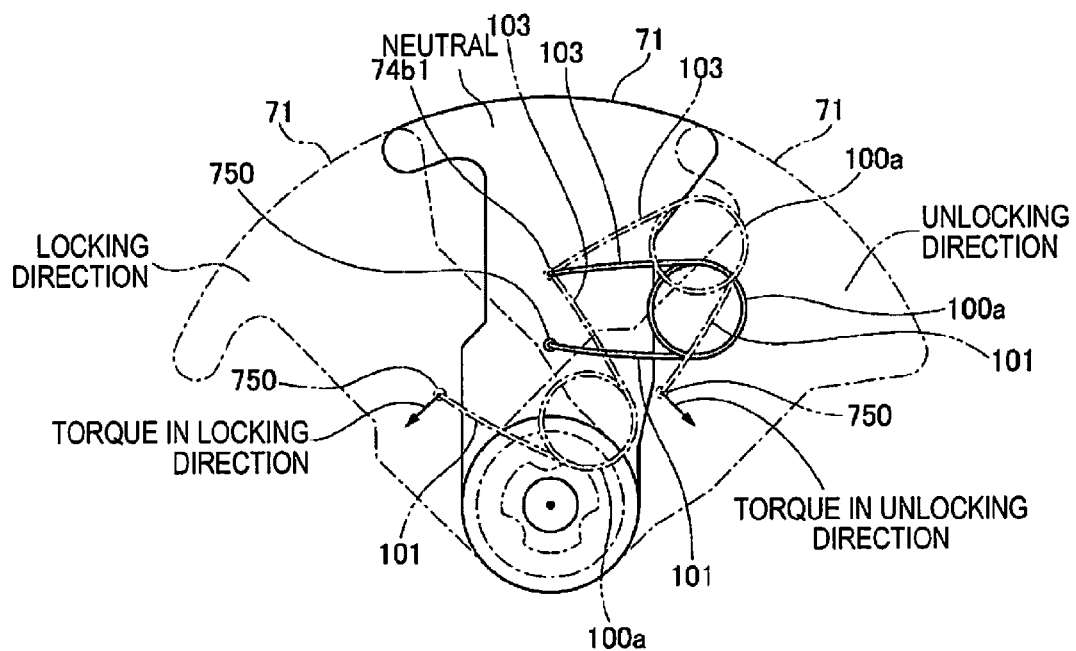
FIG. 12 is a schematic view showing the mechanical operation of the toggle spring according to the first embodiment.
Figure 13:
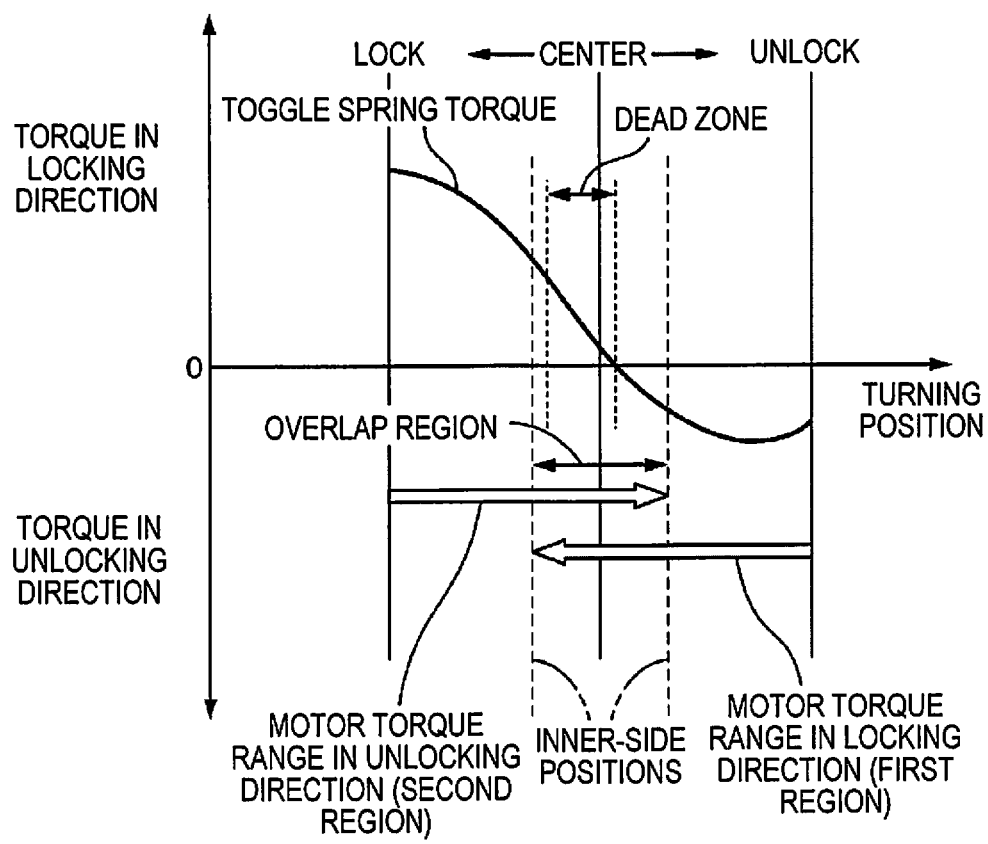
FIG. 13 is a diagram showing the positional relationship between the swing arm and the action ranges of torques from the toggle spring and the motor according to the first embodiment.

The action of the toggle spring will now be described. FIG. 11 is a schematic diagram illustrating a portion provided with the toggle spring according to the first embodiment, FIG. 12 is a schematic view showing the mechanical operation of the toggle spring according to the first embodiment, and FIG. 13 is a characteristic diagram showing the positional relationship between the swing arm and the action ranges of torques from the toggle spring and the motor according to the first embodiment. The horizontal axis represents the turn position of the swing arm 71, and indicates a position in the locked state (hereafter referred to as the locked position), a position in the unlocked state (hereafter referred to as the unlocked position), and a center position therebetween. The vertical axis represents the torque acting on the swing arm 71. The upper vertical axis represents the toggle spring torque acting in the locking direction and the lower vertical axis represents the toggle spring torque acting in the unlocking direction.

As shown in FIG. 11, the toggle spring 100 has: a coil section 100*a* for generating an elastic force; a swing arm side foot section 101 extending from the coil section 100*a* and engaging with the swing arm 71; and an insertion section 102 obtained by bending the swing arm side foot section 101 in a substantially right angle, the insertion section 102 being turnably inserted in an engaging hole 750 formed in the swing arm 71. Similarly, the toggle spring 100 has: a vehicle body side foot section 103 extending from the coil section 100*a* and engaging with the support extension section 74*b*; and an insertion section 104 obtained by bending the vehicle body side foot section 103 in a substantially right angle, the insertion section 104 being turnably inserted in an engaging hole 74*b*1 formed in the support extension section 74*b*.

A description will now be given in correspondence with a top schematic view shown in FIG. 12. FIG. 11 is a schematic view as viewed from the lateral direction when the swing arm 71 is in a neutral position, and the corresponding top view configuration is illustrated in the portion of FIG. 12 corresponding to the neutral position. At this time, the toggle spring 100 is in a bent state. At this point, the toggle spring 100 acts so as to push the foot sections 101, 103 apart. However, the force acts radially with respect to the turning center of the swing arm 71, and does not act in a direction in which the swing arm 71 is caused to turn. When the swing arm 71 is turned by the motor 731 in the locking direction from this state, the coil section 100*a* displaces downwards in FIG. 12. The force from the toggle spring 100 acting to push the foot sections 101, 103 apart is thereby imparted with a component that acts to cause the swing arm 71 to rotate in the locking direction, and the resulting torque urges the swing arm 71 towards the locked position. Similarly, when the swing arm 71 is turned by the motor 731 in the unlocking direction, the coil section 100*a* displaces upwards in FIG. 12. The force from the toggle spring 100 acting to push the foot sections 101, 103 apart is thereby imparted with a component that acts to cause the swing arm 71 to rotate in the unlocking direction, and the resulting torque urges the swing arm 71 towards the unlocked position.

Thus, it can be seen, by looking at the relationship between the turning motion of the swing arm 71 and the operation of the toggle spring 100, that the toggle spring 100 undergoes a movement in a gap between the swing arm 71 and the support extension section 74*b*. Because this movement generates friction, a predetermined dead zone is produced in the toggle spring 100 in both directions centered on a position at which the engaging hole 74*b*1 and the engaging hole 750 are aligned in a single line with the turning center of the swing arm (hereafter referred to as the spring center position). In other words, the toggle spring 100 must turn by a certain amount from the spring center position before being able to generate a turning direction torque capable of overcoming friction.

The relationship between the action of the toggle spring and the motor operation will now be described in further detail using the diagram in FIG. 13. The top view as referred to in the first embodiment is substantially equivalent to viewing from the direction in which the claw part 23*d* separates from the engaging surface 41*a*2. As described with respect to the lock mechanism, the motor 731 moves the swing arm 71 to an inner-side position short of the locked position or the unlocked position. The range in which the motor torque is outputted is, with regard to the region in which the torque acts in the locking direction, a range extending from the unlocked position, over the center, and up to a predetermined locking region (hereafter referred to as a first region), and with respect to the region in which the torque acts in the unlocking direction, a range extending from the locked position, over the center, and up to a predetermined unlocking region (hereafter referred to as a second region). Because the toggle spring 100 has a dead zone, if the operation of the motor 731 stops within the dead zone, the toggle spring force will not be able to move the swing arm 71. Therefore, when the motor 731 is operated, the swing arm 71 is always driven beyond the dead zone of the toggle spring 100. In other words, the motor 731 is controlled so that the first region and the second region overlap. The dead zone of the toggle spring 100 is formed at a position that overlaps the region in which the first region and the second region overlap. It is thereby possible to move the swing arm 71, using the torque from the toggle spring 100, to the locked position or the unlocked position.

The dead zone is set to a region offset towards the locking side from the center position of the swing arm 71. In other words, the dead zone is formed at a position such that there is more overlap in the region on the locking side of the neutral position than in the region on the unlocking side of the neutral position. A specific dead-zone-offsetting method will now be described. In order to facilitate the description, the above description for FIG. 12 was given for a spring center position, at which the engaging hole 74b1 and the engaging hole 750 are aligned in a single line with the turning center of the swing arm at the neutral position. Forming this spring center position so as to be slightly offset towards the locking side makes it possible to offset the dead zone. Thus, offsetting the dead zone to the locking side makes it possible to secure an unlocked state in a more reliable manner.

The reason for securing the unlocked state will now be described. While the vehicle is basically stationary, no particular vibrations or other movements are inputted, and the swing arm 71 is unaffected. Therefore, when the vehicle is in a stationary state such as during charging, maintaining a locked state is not difficult. In contrast, while the vehicle is traveling, vibration or another movement can be transmitted. Therefore, if a vibration having the resonance frequency of the swing arm 71 is transmitted, there is a risk of the swing arm 71 moving to a locked state despite being set to an unlocked state. In such an instance, when the operator parks the vehicle at a charging stand and attempts to charge the battery, because the swing arm 71 is in a locked state, it will not be possible to insert the charging connector 2. Because the operator is not expecting to operate the lock mechanism, such a situation will be unexpected. Therefore, reliably securing an unlocked state even when a vibration or another movement is transmitted while the vehicle is traveling prevents the operator from experiencing an unexpected situation.

As described above, the first embodiment has the following effects.

(1) The charging port device for an electric vehicle has: a charging port 4 having a convex part 41a (engaged part) which is engaged with a claw part 23d (an engaging part) of a charging connector 2 by an operation performed by a user, power from an external power supply being supplied to the charging port 4 in an engaged state; and a lock mechanism 7 for producing a locked state, in which when the claw part 23d and the convex part 41a are in an engaged state, a swing arm 71 (restricting member) is moved in a locking direction to regulate an operation of releasing the claw part 23d, restricting the engaged state from being released, and an unlocked state, in which the swing arm 71 is moved in an unlocking direction on the opposite side from the locking direction, allowing the release operation; the lock mechanism 7, when the swing arm 71 is moved to a predetermined position which corresponds to a locked state or an unlocked state, imparting a torque using a motor 731 up to an inner-side position short of the predetermined position, and moving the swing arm 71 from the inner-side position to the predetermined position using a toggle spring 100 provided between the swing arm 71 and the vehicle body side.

As a result, because the motor is not used to move the swing arm 71 across the entire actuation range of the swing arm 71, the swing arm 71 can be prevented from applying an excessive load on the motor and other elements, making it possible to improve durability. In addition, because the swing arm 71 is moved by the toggle spring 100, an urging force can be applied to a predetermined position, making it possible to consistently maintain the predetermined position.

(2) The lock mechanism 7 controls the motor 731 so that there is an overlap between a first region, in which the torque from the motor 731 acts when the swing arm 71 is moved to the locked state, and a second region, in which the torque from the motor 731 acts when the swing arm 71 is moved to the unlocked state; and the dead zone in which the swing arm 71 is not moved by the spring force from the toggle spring 100 is formed at a position that overlaps a region in which the first region and the second region overlap.

The swing arm 71 can thereby be moved to the locked position and the unlocked position using the torque from the toggle spring 100.

(3) The dead zone is formed at a position such that there is more overlap in the region on the locking-state side of a neutral position than in the region on the unlocking-state side of the neutral position.

It is thereby possible to reliably secure an unlocked state even when a vibration or another movement is inputted while the vehicle is traveling, and to prevent the operator from experiencing an unexpected situation.

(4) The restricting member is a swing arm which switches between the locked state and the unlocked state by turning. It is thereby possible to maintain a sufficient restricting state using a simple configuration. It is also possible to transfer components employed in existing auto-door-lock and similar mechanisms for use in order to reduce production cost.

The present invention has been described above on the basis of an embodiment; however, other configurations are also possible. In the embodiment, an example is given in which the present invention is a charging port disposed on the front of the vehicle; however, the invention may be disposed on the rear or a side of the vehicle. In addition, although a description was given in the embodiment with regard to an electric automobile, the present invention can also be used in a plug-in hybrid vehicle or another vehicle.

In addition, in the embodiment, an example was given for a configuration in which a coil spring is used as the toggle spring; however, there is no problem in applying another configuration having the same effect. For example, the urging force may be applied using a see-saw-type toggle switch. In addition, in the embodiment, a description was given for an example in which a switch is made between a restricting state and a non-restricting state by a turning motion. However, the switch is not limited to one that is made by a turning motion, and a configuration in which a switch is made by a structure that slides longitudinally or laterally is also possible.

The invention claimed is:

1. A charging port device for an electric vehicle, comprising:
   a charging port having an engaged part configured to engage an engaging part of a charging connector, and receive power from an external power supply being supplied to the charging port when in an engaged state; and
   a lock mechanism including a restricting member moveable in a locking direction and an unlocking direction to regulate release of the engaging part, the lock mechanism being locked when the engaging part and the engaged part are in the engaged state, and the restricting member is moved in the locking direction to restrict the engaged state between the engaging part and the engaged part from being released, and the lock mechanism being unlocked, when the restricting member is moved in the unlocking direction, which is opposite the locking direction, enabling a release operation, the lock mechanism, while the restricting member is being moved to a predetermined position which corresponds to one of a locked state or an unlocked state, imparts a torque using a motor to move the restricting member to an inner-side position that is near the predetermined position and to move the restricting member from the inner-side position to the predetermined position using a toggle spring that is disposed between the restricting member and a vehicle body side.

2. The charging port device for an electric vehicle disclosed in claim 1, wherein the lock mechanism is configured to control the motor so that there is an overlap between a first region, in which the torque from the motor acts when the restricting member to the locked state, and second region, in which the torque from the motor acts when the restricting member to the unlocked state, and the lock mechanism includes a dead zone, in which the restricting member is not moved by a spring force from the toggle spring, is formed at a position that overlaps with a region in which the first region and the second region overlap.

3. The charging port device for an electric vehicle according to claim 2, wherein the dead zone is formed at a position such that there is more overlap in the region on the locking-state side of a neutral position of the restricting member than in a region on the unlocking-state side of the neutral position.

4. The charging port device for an electric vehicle according to claim 1, wherein the restricting member is a swing arm configured to switch between the locked state and the unlocked state by turning.

5. The charging port device for an electric vehicle according to claim 2, wherein the restricting member is a swing arm configured to switch between the locked state and the unlocked state by turning.

6. The charging port device for an electric vehicle according to claim 3, wherein the restricting member is a swing arm configured to switch between the locked state and the unlocked state by turning.

\* \* \* \* \*